United States Patent

Strickland et al.

Patent Number: 5,318,213
Date of Patent: Jun. 7, 1994

[54] EXPLOSIVE BONDING

[75] Inventors: George Strickland; Ian E. Bottomley, both of Preston, United Kingdom

[73] Assignee: British Aerospace Public Limited Company, London, England

[21] Appl. No.: 78,855

[22] Filed: Jun. 21, 1993

Related U.S. Application Data

[63] Continuation of Ser. No. 800,037, Nov. 29, 1991, abandoned.

[30] Foreign Application Priority Data

Nov. 30, 1990 [GB] United Kingdom ............... 9026134

[51] Int. Cl.$^5$ ............................................. B23K 20/08
[52] U.S. Cl. ............................... 228/107; 228/157; 228/221
[58] Field of Search ............... 228/107, 108, 109, 118, 228/157, 186, 221

[56] References Cited

U.S. PATENT DOCUMENTS

| | | | |
|---|---|---|---|
| 3,031,746 | 5/1962 | Ciarleglio et al. | 29/455 |
| 3,141,236 | 7/1964 | Dunne et al. | 228/109 X |
| 3,813,758 | 6/1974 | Araki | 228/108 |
| 4,811,766 | 3/1989 | Sastry et al. | 228/107 X |
| 4,887,761 | 12/1989 | Hardwick | 228/107 |
| 5,025,974 | 6/1991 | Strickland | 228/107 |
| 5,067,649 | 11/1991 | Hardwick | 228/107 |
| 5,069,383 | 12/1991 | Cooper et al. | 228/157 |

FOREIGN PATENT DOCUMENTS

| | | | |
|---|---|---|---|
| 0324231 | 7/1989 | European Pat. Off. | |
| 3528494 | 2/1987 | Fed. Rep. of Germany | |
| 13283 | 1/1991 | Japan | 228/221 |
| 7500353 | 7/1975 | Netherlands | 419/49 |
| 0953789 | 4/1964 | United Kingdom | |

*Primary Examiner*—Kenneth J. Ramsey
*Attorney, Agent, or Firm*—Cushman, Darby & Cushman

[57] ABSTRACT

A process is disclosed of explosive bonding two or more components together by forming the components into a stack, placing the stack into an envelope made of a deformable material, sealing the envelope except for an evacuation port, evacuating the interior of the envelope through the said port and subjecting the stack to explosive bonding within the envelope, thereby joining the components together; by conducting the explosive bonding in an evacuated envelope, not only are the components protected from damage during the explosion but the bonding is enhanced due to the reduced pressure of air between the components. After bonding, the stack can be subjected to superplastic forming.

3 Claims, 1 Drawing Sheet

U.S. Patent June 7, 1994 5,318,213

EXPLOSIVE BONDING

This is a continuation of application Ser. No. 07/800,037, filed on Nov. 29, 1991, which was abandoned upon the filing hereof.

FIELD OF THE INVENTION

The present invention relates to improvements in the explosive bonding of two or more metal components to form a composite bonded article and is particularly (although not exclusively) concerned with composite articles that are subsequently subject to superplastic forming to provide a finished or semi-finished product for use in the aerospace industry. The components are preferably made of aluminium although other superplastically formable metals, e.g. titanium, could also be used; alloys of these metals can also be used.

BACKGROUND OF THE INVENTION

U.S. Pat. No. 5,025,974 describes a method of explosive bonding aluminium components together prior to superplastic forming and describes a method of heat treating the bonded components.

In explosive bonding, it is usual to place the components being bonded upon a substantial structure (known as an "anvil") and to place a plate (known as a "driver plate") on top of the components. Explosive is placed on top of the driver plate and detonated, the driver plate transmits the force of the explosion to the components, which are bonded together by such forces. By using a driver plate, damage to the surface of the topmost component is minimized. Using such a process it is possible to bond two or more components together.

One problem with the above process is that a bond can also form between the anvil and the composite bonded structure and/or between the driver plate and the composite structure and this makes removal of the structure from the anvil/driver plate difficult. To avoid this problem, common salt has been placed between the anvil and the components and between the components and the driver plate. Unfortunately, the force of the explosion causes air burning in the spaces between the components and the anvil/driver plate which degrades the components. Furthermore, the force generated by the explosion can cause the surfaces of the structure to become degraded as a result of their being forced against the anvil and driver plate.

In an effort to overcome these problems, it has been proposed to place sheets of rubber between the anvil and the components and between the components and the driver plate but unfortunately this does not completely eliminate the problem of air burning.

It has been proposed in EP-0 445 997 to protect a stack of sheets from damage during the explosive bonding step of an explosive bonding/superplastic forming process by coating the top and bottom surfaces of the stack with a resilient material and conducting the explosive bonding on a bed of common salt.

SUMMARY OF THE INVENTION

According to the present invention, there is provided a process of explosive bonding two or more components together which process comprises forming a stack of the two or more components, sealing the stack in an envelope made of deformable material, evacuating the interior of the envelope through an evacuation port formed in the envelope and subjecting the stack to explosive bonding within the envelope.

Explosive bonding will usually be performed by placing the stack within the evacuated envelope on an anvil, placing a driver plate on top of this assembly, placing an explosive charge on top of the driver plate and detonating the charge. A layer of inert granular material, e.g. salt, may be included between the evacuated envelope and one or both of the anvil and the driver plate to avoid bonding of the envelope to the anvil/driver plate but in this case, the surface of the stack of components is not degraded because it is shielded from the salt by the envelope.

It will be appreciated that the envelope not only prevents surface degradation by the direct impact between the stack and the anvil/driver plate but also protects the stack from surface degradation due to air burning.

The use of the evacuated envelope has further advantages in that there is no (or a reduced amount of) air within the envelope and between the components of the stack. Such air could dampen the forces resulting from the explosion and hence, by eliminating such air, explosive bonding is enhanced. Also, because of evacuation of the envelope, there is a pressure difference across the envelope material that holds together and compresses the components of the stack, thereby further enhancing the bonding. The absence of air within the envelope also means that air pockets cannot be trapped between the components of the stack, which could prevent a bond being formed between the components.

The bonded stack can be subjected to superplastic forming and stopping-off material can be applied to the components of the stack to prevent bonding in selected areas thereof.

The envelope can be sealed by means of an adhesive or by heat sealing. The envelope can be made of any material that can withstand the forces of explosive bonding and that is not bonded to the stack by the explosive forces (although a release agent can be applied to reduce or eliminate such bonding); the preferred material is a polymeric film.

BRIEF DESCRIPTION OF DRAWINGS

The invention will be described in greater detail by way of example only with reference to the accompanying drawings in which.

DESCRIPTION OF THE PRESENTLY PREFERRED EMBODIMENTS

Figure 1:
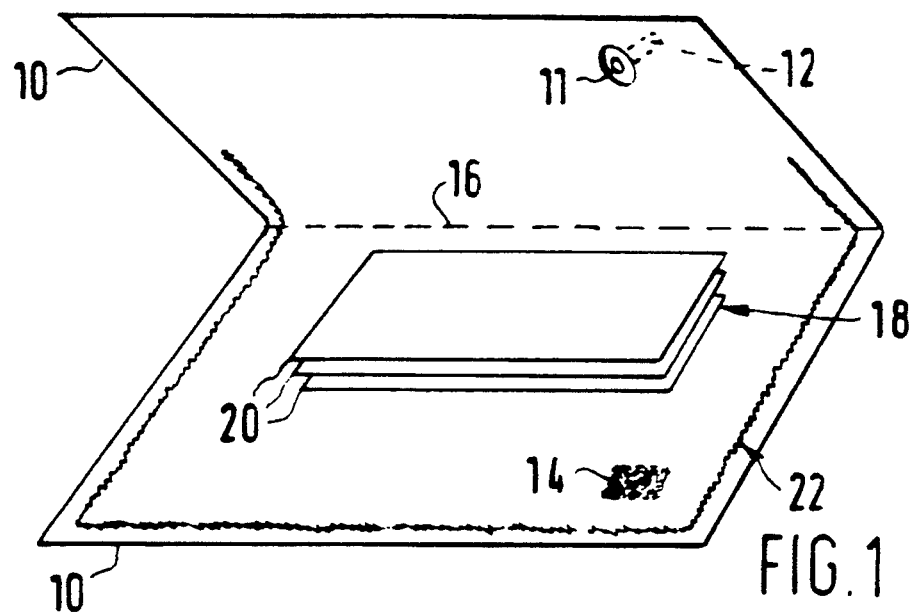
FIG. 1 is a perspective view of a stack of sheets in a partially-closed envelope.
Figure 2:
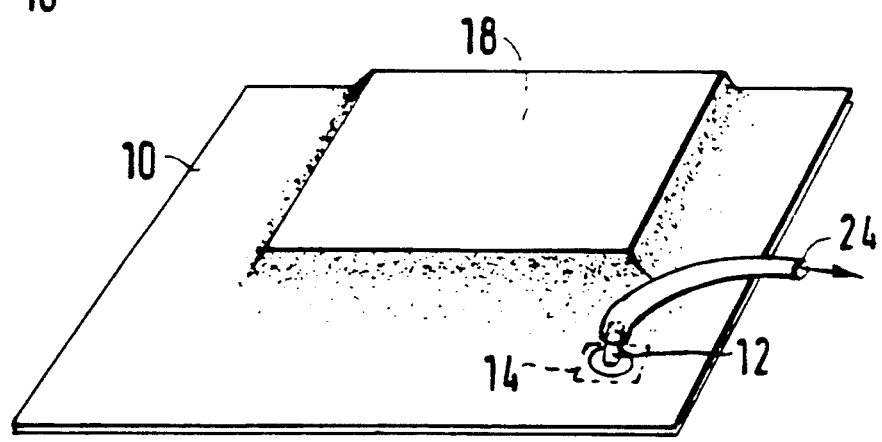
FIG. 2 is a perspective view of the envelope containing the stack of FIG. 1 after the envelope has been sealed and evacuated.

Referring to the accompanying drawings, FIG. 1 shows an envelope 10 in the form of a rectangular foil made of a material such as Wrightlon 7400/2, 7400/3 or 8400/2; Wrightcast 8500 or 5550; Ipplon DP 1000/2, WN1500/2, WN1500/3 or DPT 1000 (all of the foregoing are available from Air Tech); HS 8171/2 or HS 6262/3 (both of which are available from Richmond Inc); TYGAVAC NBF 205 or ABF 305 (both of which are available from Fothergill and Harvey); or CAPRON 80 (available from Aerovac Systems of Keithley, U.K.). The envelope incorporates a vent tube 12 passing through the envelope material and forming an evacuation port 11 at its inner end; a pad 14 of permeable material, e.g. a non-woven or loosely woven fabric, is located opposite the evacuation port 11 of the vent tube 12 when the envelope is folded along line 16. A stack 18 of sheets 20 are placed on the envelope and a sealant 22 (e.g. GS 213, GS 100 and GS 43MR (all available from Air Tech), RS 200 (available from Richmond Inc), SM 5127 (available from Aerovac) and SM 5177 and SM 5166-2 (both available from Schee Moor Head Inc, Aerovac and Allied Chemicals Inc)) is applied around the edge region of one face of the envelope 10. The sheets 20 in the stack 18 are spaced apart by spacers (not shown) as is usual in the explosive bonding art. The envelope is then folded over about line 16 and sealed by compressing the edge regions bearing the sealant 22. The vent tube 12 will thus be located opposite the pad 14; the pad 14 prevents the inside end of the tube from being closed by the envelope material pressing against the tube. The vent tube is then connected to a vacuum pump via a line 24 (see FIG. 2) and the interior of the envelope is evacuated.

Figure 3:
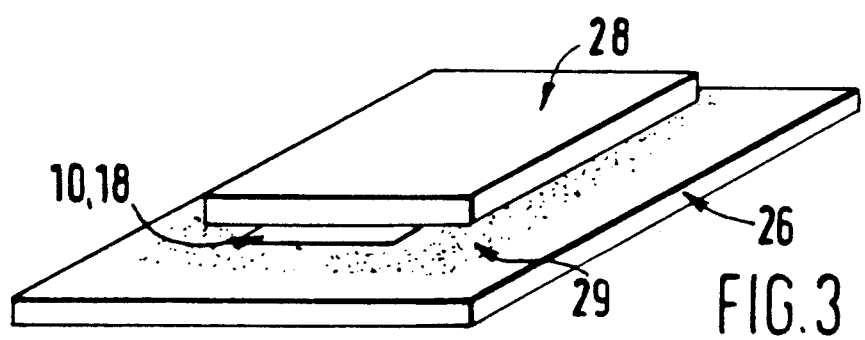
FIG. 3 is a perspective view of the envelope and stack of FIGS. 1 and 2 placed between an anvil and a driver plate and ready for explosive bonding.

After evacuation, the vent tube is sealed and the envelope is placed on an anvil 26 (see FIG. 3) and covered by a driver plate which may be a 10 mm mild steel plate 28. An explosive charge is detonated above the driver plate, forcing the plate towards the anvil and compressing the envelope 10 and the enclosed stack 18. The explosion thus forces the sheets in the stack against one another with such a force that the sheets are bonded together. The envelope and stack can be extracted from between the anvil and the driver plate and the envelope material removed. If the envelope material has a tendency to be bonded to the outer sheets of the stack 18 by the explosive bonding, this can be prevented by placing a release agent between the outside of the stack and the inside of the envelope material. Bonding between the envelope and one or both of the anvil and the driver plate can likewise be prevented by known techniques, e.g. a layer 29 of common salt.

The bonded stack can then be subjected to superplastic forming by known techniques, optionally after it has been trimmed and heat-treated as described in U.S. Pat. No. 5,025,974. According to known superplastic forming techniques, a stack of components is heated, optionally in a mold, and an inert gas is supplied to selected areas between adjacent components within the stack (in these selected areas, the adjacent components have not been bonded together). The gas can be supplied through pipes communicating with the unbonded areas and the gas pressure slowly inflates the stack (in a manner similar to a balloon) to form a structure having one or more cavities therein. In order to prevent adjacent sheets in the stack from being bonded together across their entire contacting faces during explosive bonding, a stopping-off material, e.g. alumina, silica or a glass cloth, can be applied between the components in those selected areas of the sheets where it is desired that no bond is to be formed during explosive bonding. The stopping-off material should preferably be porous to allow the gas to spread throughout the stopped-off area during superplastic forming. After superplastic forming, the article is removed from the mold.

We claim:

1. A process of explosive bonding at least two components together, said process comprising the steps of:
    arranging the at least two components in a stack;
    sealing the stack within a deformable material to form an envelope having the stack disposed in an interior thereof;
    providing an evacuation port in said envelope;
    providing a pad of porous material in said envelope adjacent to said evacuation port;
    evacuating the interior of the envelope through said evacuation port; and
    subjecting the stack to explosive bonding via the envelope to form a bonded stack.

2. A process of explosive bonding at least two components together, said process comprising the steps of:
    arranging the at least two components in a stack;
    sealing the stack within a deformable material to form an envelope having the stack disposed in an interior thereof;
    placing a release agent between an exterior surface of the stack and an interior surface of the envelope;
    evacuating the interior of the envelope; and
    subjecting the stack to explosive bonding via the envelope to form a bonded stack.

3. A process of superplastically forming at least two components to form an article having at least one cavity therein, said process comprising the steps of:
    applying a stopping-off material to at least one selected area of the components to prevent bonding in said at least one area;
    arranging the components in a stack so that the stopping-off material lies between adjacent components in the stack;
    sealing the stack within a deformable material to form an envelope having the stack disposed in an interior thereof;
    providing an evacuation port in said envelope;
    providing a pad of porous material in said envelope adjacent to said evacuation port;
    evacuating the interior of the envelope through said evacuation port;
    subjecting the stack to explosive bonding via the envelope to bond the two components together except in said at least one area, thereby forming a bonded stack; and
    superplastically forming the bonded stack by injecting a fluid into said at least one cavity.

* * * * *